J. U. BARR.
AUTOMOBILE GOGGLES.
APPLICATION FILED OCT. 20, 1911.
1,067,793.
Patented July 22, 1913.
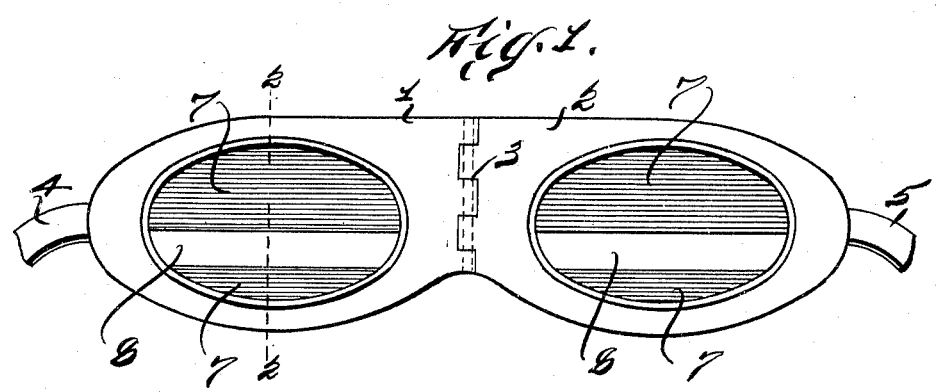
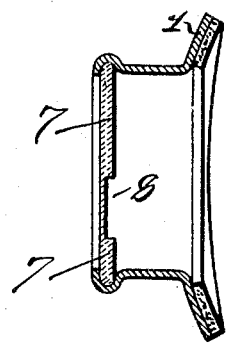

UNITED STATES PATENT OFFICE.

JOHN U. BARR, OF NEW YORK, N. Y.

AUTOMOBILE-GOGGLES.

1,067,793.　　　　　Specification of Letters Patent.　　Patented July 22, 1913.

Application filed October 20, 1911. Serial No. 655,668.

*To all whom it may concern:*

Be it known that I, JOHN U. BARR, a citizen of the United States, residing at New York city, New York, have invented certain new and useful Improvements in Automobile-Goggles, of which the following is a clear, full, and exact description.

The object of this invention is to provide an improved form of goggle for automobile or similar outdoor use, where the user rides either in the sun or at times before the glare of strong lights.

It will be recognized by all who have motored at night that on approaching a car fitted with the powerful search lights on each side, one is dazzled and blinded by the illumination of the approaching car to such an extent that one has great difficulty in keeping his proper position in the road with relation to stones, stumps, trees, fences and gutters.

In carrying out this invention I provide goggles with the ordinary strap, rims and eye protecting leathers, and in the rims I provide glasses, part of which are colored to prevent the admission of the dazzling light to the eye, so that the eye may look at an approaching machine or at the sun, and other parts of the glass or glasses are clear and transparent, as is ordinary in glasses.

The scope of my invention will be pointed out in the claim.

In the accompanying drawings:—Figure 1 is a face view of a portion of automobile goggles equipped with my invention. Fig. 2 is a vertical sectional view, the section being taken on a line 2—2 in Fig. 1.

As shown in the drawings, 3 is a hinge connecting the eye shield portions 1 and 2.

4 and 5 are the two ends of the strap for securing the goggles to the head.

In each rim on each side of the hinge I mount a glass, which is of two thicknesses, and which is darkened or colored, so that the thicker part of the glass permits one to look therethrough at the bright light, while the remaining part or thinner part is comparatively clear, that one may look therethrough at all times as in ordinary goggles. As shown in Figs. 1 and 2, I use a single cut-out as at 8 to form a channel. As shown in the drawings, the glass itself is formed tinted or colored throughout, so that by cutting the glass, as is shown in the cross-sectional view, enough of the glass can be removed to give the apparent impression of clearness at that point so as to render that portion more transparent to light than the rest of the glass.

I claim as my invention:

The herein described goggles consisting of a pair of eye shields and a pair of glasses set therein, each glass of one piece having portions thereof of different thicknesses and colored, whereby one portion is rendered substantially clear and the other more or less clouded as and for the purposes described.

Signed at New York city, New York, this 17th day of October, 1911.

JOHN U. BARR.

Witnesses:
　MABEL DITTENHOEFER,
　FRED FRANCIS WEISS.